United States Patent [19]
Nishio et al.

[11] Patent Number: 5,786,744
[45] Date of Patent: Jul. 28, 1998

[54] HYBRID SENSOR

[75] Inventors: Tomoyuki Nishio; Satoshi Hiyama; Mizuho Doi; Nobuhiro Fueki; Hiroshi Yamakawa, all of Wako, Japan

[73] Assignee: Honda Giken Kogyo Kabushiki Kaisha, Tokyo, Japan

[21] Appl. No.: 409,197

[22] Filed: Mar. 23, 1995

[30] Foreign Application Priority Data

Mar. 24, 1994 [JP] Japan ................. 6-054122
Apr. 4, 1994 [JP] Japan ................. 6-066277

[51] Int. Cl.$^6$ .......................................... H01C 7/00
[52] U.S. Cl. .................... 338/14; 338/13; 338/25; 338/43; 73/504.03
[58] Field of Search ........................ 338/14, 36, 43, 338/25, 22 R, 47, 13, 231, 234, 53; 73/510, 511, 497, 514.09, 504.03, 504.04, 504.05

[56] References Cited

U.S. PATENT DOCUMENTS

| | | | |
|---|---|---|---|
| 2,440,189 | 4/1948 | Zworykin | 73/514.09 |
| 2,455,394 | 12/1948 | Webber | 73/514.09 |
| 3,241,374 | 3/1966 | Menkis | 73/514.09 |
| 3,247,723 | 4/1966 | Yavne | 73/514.09 |
| 3,631,729 | 1/1972 | Moore | 73/516 |
| 3,635,095 | 1/1972 | Schuemann | 73/505 |
| 4,026,159 | 5/1977 | Isakson et al. | 73/516 LM |
| 4,114,453 | 9/1978 | Sandler | 73/514.33 |
| 4,147,063 | 4/1979 | Bower et al. | 73/504 |
| 4,156,364 | 5/1979 | Hill | 73/194 F |
| 4,254,659 | 3/1981 | Benedetto et al. | 73/516 LM |
| 4,348,900 | 9/1982 | Takahashi et al. | 73/505 |
| 4,407,161 | 10/1983 | Ferrar | 73/505 |
| 4,408,490 | 10/1983 | Takahashi et al. | 73/497 |
| 4,542,650 | 9/1985 | Renken et al. | 73/204 |
| 4,584,878 | 4/1986 | Katsuno | 73/497 |

(List continued on next page.)

FOREIGN PATENT DOCUMENTS

| | | | |
|---|---|---|---|
| 405452A2 | 1/1991 | European Pat. Off. | |
| 519404 | 12/1992 | European Pat. Off. | 73/504.05 |
| 57-200813 | 12/1982 | Japan . | |
| 63-81269 | 4/1988 | Japan . | |
| 63-293471 | 11/1988 | Japan . | |
| 63-293472 | 11/1988 | Japan . | |
| 63-298066 | 12/1988 | Japan . | |
| 63-298067 | 12/1988 | Japan . | |
| 63-298068 | 12/1988 | Japan . | |
| 402102457 | 4/1990 | Japan | 73/504.05 |
| 4-93622 | 3/1992 | Japan . | |
| 5-133762 | 5/1993 | Japan . | |
| 8802819 | 4/1988 | WIPO . | |

OTHER PUBLICATIONS

U.S. application No. 08/376,155, Hosoi et al., filed Jan. 20, 1995.
U.S. application No. 08/390,875, Doi et al., filed Feb. 17, 1995.
U.S. application No. 08/408,996, Nishio et al., filed Mar. 23, 1995.
U.S. application No. 08/384,910, Shinotuka et al., filed Feb. 7, 1995.
European Search Report dated Apr. 1997 in corresponding Application No. 95301989.0.
Article "Infrared Sensors and Sensor Fushion", vol. 782 (May 1987) Proceedings of the SPIE.

*Primary Examiner*—Geoffrey S. Evans
*Assistant Examiner*—Karl Easthom
*Attorney, Agent, or Firm*—Lyon & Lyon LLP

[57] ABSTRACT

A hybrid sensor which is comprised of an acceleration sensor for detecting acceleration based on a temperature distribution of a predetermined gas hermetically enclosed within a fluid-tight space, and an angular velocity sensor for detecting angular velocity based on a deviation of a flow of a predetermined gas. The acceleration sensor and the angular velocity sensor are formed in one piece by the use of semiconductor processing technology in such a manner that the acceleration sensor and the angular velocity sensor are formed on a plurality of semiconductor substrates, and then the plurality of semiconductor substrates are superposed one upon another and united into a laminate.

17 Claims, 9 Drawing Sheets

U.S. PATENT DOCUMENTS

| | | | |
|---|---|---|---|
| 4,592,232 | 6/1986 | Moffatt et al. | 73/505 |
| 4,717,891 | 1/1988 | Ichise et al. | 331/17 |
| 4,750,364 | 6/1988 | Kawamura et al. | 73/510 |
| 4,920,655 | 5/1990 | Van Steenwyk | 33/304 |
| 4,930,349 | 6/1990 | Takahashi et al. | 73/497 |
| 4,951,507 | 8/1990 | Takahashi et al. | 73/497 |
| 4,951,510 | 8/1990 | Holm-Kennedy et al. | 73/510 |
| 5,012,676 | 5/1991 | Takahashi et al. | 73/497 |
| 5,107,707 | 4/1992 | Takahashi et al. | 73/516 LM |
| 5,108,193 | 4/1992 | Furubayashi | 338/25 |
| 5,270,960 | 12/1993 | Ikegami et al. | 364/571.03 |
| 5,385,046 | 1/1995 | Yamakawa et al. | 73/516 LM |
| 5,438,871 | 8/1995 | Hosoi et al. | 73/504.05 |
| 5,476,820 | 12/1995 | Fueki et al. | 437/250 |

HYBRID SENSOR

BACKGROUND OF THE INVENTION

1. Field of the Invention

This invention relates to a hybrid sensor which is comprised of an angular velocity sensor and an acceleration sensor, for detecting the direction of movement of a moving object and angular velocity of the same, and more particularly to a hybrid sensor of this kind in which the angular velocity sensor and the acceleration sensor are integrated in one piece by semiconductor manufacturing technology, as well as to a hybrid sensor which is adapted to correct a sensitivity drift and an offset drift of the angular velocity sensor or the acceleration sensor during movement of the moving object based on an angular velocity signal and an acceleration signal delivered from the two sensors.

2. Prior Art

A multi-axis acceleration sensor is conventionally known, which includes a support member, a heat-generating resistance element and a temperature-sensitive resistance element which each are formed of a thin wire made of platinum, tungsten, or a like material and fixed to the support member, and a casing charged with a gas and enclosing the above components in hermetically sealed manner.

Such a conventional multi-axis acceleration sensor is constructed such that a heat-generating resistance element which is displaced by acceleration is arranged at the center of a space within the casing, with pairs of temperature-sensitive resistance elements being arranged along multiple axes (e.g. X-axis, Y-axis, and Z-axis) intersecting at right angles with each other about the heat-generating resistance element, for detecting a change in temperature distribution within the space resulting from a displacement of the heat-generating resistance element. Based on the changes in the resistance value of each pair of the resistance elements, the magnitude of acceleration in the corresponding direction is detected, while the direction of the acceleration being acted is detected from the arrangement of the each pair of the resistance elements which detect the change in the value of resistance.

Further, a three-dimensional acceleration sensor has been proposed by Japanese Laid-Open Patent Publication (Kokai) No. 63-118667, which is comprised of three one-dimensional acceleration sensors arranged on respective three surfaces (X, Y, Z) of a cubic block orthogonal to each other, each of the one-dimensional acceleration sensors having a mass element and a beam element supporting the mass element and formed with a resistance portion, the mass element and the beam element being formed on a semiconductor substrate, for detecting a change in the resistance value of the resistance portion corresponding to a degree of bend of the beam element caused by the action of acceleration.

On the other hand, a conventional multi-axis gas rate sensor is known, which is comprised of a casing having support members, and a plurality of heat wire temperature-sensitive resistance elements each formed of a thin wire made of platinum or tungsten, the heat wire temperature-sensitive resistance elements being mounted in pairs on the support members, for detecting angular velocities in respective desired directions.

However, the conventional multi-axis acceleration sensor suffers from a problem that it takes much time to assemble and make sensitivity adjustment. More specifically, it requires mounting the heat-generating resistance element and the temperature-sensitive resistance elements onto the support member of the casing, and alignment of each pair of the resistance elements along each axis, as well as adjustment of the sensitivity of the sensor by adjusting the distance of each pair of temperature-sensitive resistance elements from the heat-generating resistance element.

Further, there can inevitably occur variations in the sensitivity between individual sensors due to variations or tolerances of individual heat-generating resistance elements and temperature-sensitive resistance elements, which makes it necessary to select suitable ones from the heat-generating resistance elements and temperature-sensitive resistance elements, and adjust output characteristics of individual sensors before delivery.

The three-dimensional acceleration sensor proposed by Japanese Laid-Open Patent Publication (Kokai) No. 63-118667 suffers from a problem that it takes much time to make alignment of the three one-dimensional acceleration sensors formed on the semiconductor substrates with the three axes orthogonal to each other in mounting them onto the surfaces of the cubic block.

On the other hand, the aforementioned conventional multi-axis gas rate sensor suffers from a problem that in mounting the heat wire temperature-sensitive resistance elements which are discrete parts formed of platinum or tungsten thin wires onto the support members, it is difficult to precisely locate and position each pair of heat wire temperature-sensitive resistance elements at a proper distance from the central axis of flow of gas and in a proper direction relative thereto (i.e. perpendicularity to the central axis), and it takes much time to adjust the locations and positions of the elements for securing sufficient accuracy thereof.

Further, this type of gas rate sensor is composed of discrete parts (the heat wire temperature-sensitive resistance elements, the support members, and the casing), and hence requires selecting heat wire temperature-sensitive resistance elements having suitable characteristics (resistance value and temperature characteristic) and proper characteristic parity for use as pairs.

Another conventional sensor of this kind has been proposed by Japanese Laid-Open Patent Publication (Kokai) No. 59-218913, which is comprised of a combination of an angular velocity sensor and an earth magnetism sensor for detecting the moving direction of a moving object on which the sensor is installed, wherein a direction (angle) signal delivered from the angular velocity sensor indicative of the angular velocity of the moving object and a direction or azimuth (angle) signal delivered from the earth magnetism sensor are synthesized in a suitable ratio, and based on the synthesization result, the direction of movement of the moving object is detected.

According to the proposed sensor, the synthesization ratio of either the signal delivered from the angular velocity sensor or the signal delivered from the earth magnetism sensor is increased or decreased depending on circumstances under which the moving object is moving so as to make the best of the respective characteristics of the sensors.

For example, the earth magnetism sensor is advantageous in that it is capable of detecting the present absolute advancing direction of the moving object since it senses the earth magnetism and thereby detects a relative angle formed between the advancing direction of the moving object and the horizontal direction of the same.

However, the earth magnetism sensor is largely susceptible to disturbances when the moving object passes a railroad crossing or a railway bridge, for example.

On the other hand, the angular velocity sensor is comprised of a gas rate sensor adapted to detect the angular velocity of the moving object based on a change in the electric resistance of temperature-sensitive resistance elements exposed to a flow of gas in a hermetically sealed container, and hence is less susceptible to disturbances.

However, the angular velocity sensor suffers from drifts in the sensitivity and the offset, so that the direction (angle) signal which is obtained by integrating detected values of the angular velocity is not free from an error, and such errors are accumulated into a large error as time elapses.

The proposed sensor utilizes the above respective characteristics or merits of the two sensors and is constructed such that the output from the earth magnetism sensor is used in a high ratio (100%) to detect the direction of movement of the moving object at an early stage of the movement thereof, and thereafter it is switched to the output from the angular velocity sensor in such a smooth manner without discontinuity that the ratio of use of the output from the angular velocity sensors is gradually increased while the ratio of use of the output from the earth magnetism sensor is gradually decreased.

Further, when the moving object is traveling with the output from the angular velocity sensor alone being used to detect the moving direction, if the traveling has continued over a long time without stopping, the ratio of use of the output from the angular velocity sensor is decreased in response to the non-stop time period which is always monitored while the ratio of use of the output from the earth magnetism sensor is increased, thereby preventing a drift in the angular velocity sensor and a drift in the offset.

In short, the proposed sensor, which uses an earth magnetism sensor and an angular velocity sensor in combination, adjusts the ratio of use of the outputs from these sensors so as to adapt the hybrid sensor to the traveling condition of the moving object, thereby making it possible to detect the direction of movement of the moving object with accuracy.

Further, another sensor of this kind is also known, which also uses an earth magnetism sensor and an angular velocity sensor in combination, and is constructed such that a direction (angle) detected by the earth magnetism sensor and a direction (angle) detected the angular velocity sensor are compared with each other, one of the directions (angles) obtained by the two sensors is regarded as an accurate direction, and an error factor of the output from the other sensor is corrected so as to make zero the difference between the directions (angles) obtained by the sensors.

These conventional sensors have a problem that the earth magnetism sensor is susceptible to disturbances caused by magnetization when the moving object passes a railway crossing, a railway bridge or the like, and as a result, in switching from the output from the earth magnetism to the output from the angular velocity sensor, or when the output from the earth magnetism sensor is regarded as indicative of an accurate direction, the angle detected by the earth magnetism sensor is changed, preventing accurate direction detection.

Further, another disadvantage with these sensors is that due to the use of the angular velocity sensor, there arise drifts in the sensitivity and the offset, which result from a change in the temperature and aging, so that the azimuthal angle obtained by time integration of the angular velocity suffers from an increased error resulting from accumulated integral values of the drifts.

SUMMARY OF THE INVENTION

It is a first object of the invention to provide a hybrid sensor which is capable of accurately and reliably detecting the direction (azimuthal angle) of a moving object, and also can be manufactured at low costs.

It is a second object of the invention to provide a hybrid sensor which is capable of correcting a sensitivity drift and an offset drift during movement of a moving object, to thereby detect the direction of movement of the moving object and/or acceleration acting on the moving object, with high accuracy.

To attain the first object, the present invention provides a hybrid sensor which comprises:

an acceleration sensor for detecting acceleration based on a temperature distribution of a predetermined gas hermetically enclosed within a fluid-tight space; and an angular velocity sensor for detecting angular velocity based on a deviation of a flow of a predetermined gas, the acceleration sensor and the angular velocity sensor being formed in one piece by the use of semiconductor processing technology in a manner such that the acceleration sensor and the angular velocity sensor are formed on a plurality of semiconductor substrates, and then the plurality of semiconductor substrates are superposed one upon another and united into a laminate.

Preferably, the acceleration sensor comprises heat-generating resistance means for heating the predetermined gas to form the temperature distribution within the fluid-tight space, and temperature-sensitive resistance means for detecting a change in the temperature distribution caused by acceleration acting on the hybrid sensor.

Also preferably, the heat-generating resistance means comprises a heat-generating resistance element arranged at a center of the fluid-tight space, and the temperature-sensitive resistance means comprises at least one pair of temperature-sensitive resistance elements, the temperature-sensitive resistance elements of each pair being arranged in a fashion being symmetrical with respect to the heat-generating resistance element along a corresponding one of plurality of axes.

Advantageously, the predetermined gas enclosed within the fluid-tight space is a pressurized gas having low thermal conductivity.

In a preferred form, the angular velocity sensor comprises a gas passage through which the predetermined gas is caused to flow, and heat wire resistance means arranged within the gas passage for detecting the deviation of the flow of the predetermined gas caused by action of the angular velocity.

Preferably, the heat wire resistance means comprises at least one pair of heat wire temperature-sensitive resistance elements, the heat wire temperature-sensitive resistance elements of each pair being arranged in a fashion being symmetrical with respect to a central axis of the flow of the predetermined gas along a corresponding one of a plurality of axes.

In the present invention, various types of accelerations and angular velocity sensors may be employed in combination to form the hybrid sensor. For example, the hybrid sensor may be formed by a combination wherein the acceleration sensor is a two-axis acceleration sensor and the angular, a combination wherein the acceleration sensor is a three-axis acceleration sensor and the angular velocity sensor is a one-axis angular velocity sensor, a combination wherein the acceleration sensor is a three-axis acceleration sensor and the angular velocity sensor is a two-axis angular velocity sensor, or a combination wherein the acceleration sensor is a three-axis acceleration sensor and the angular velocity sensor is a three-axis angular velocity sensor.

In an advantageous application, the hybrid sensor may be installed on a moving object, and wherein the acceleration sensor detects acceleration of the moving object and the angular velocity sensor detects angular velocity of the moving object.

To attain the second object, the present invention provides a hybrid sensor for use in a moving object, for detecting a moving direction of the moving object and acceleration acting on the moving object, during movement of the moving object, comprising:

an angular velocity sensor for detecting angular velocity of the moving object and delivering an angular velocity signal indicative of the detected angular velocity;

an acceleration sensor for detecting the acceleration acting on the moving object and delivering an acceleration signal indicative of the detected acceleration; and sensor-correcting means for correcting a sensitivity coefficient and an offset value of at least one of the angular velocity sensor and the acceleration sensor, based on the angular velocity signal from the angular velocity sensor, the acceleration signal from the acceleration sensor, and a speed signal from a speed sensor for detecting speed of the vehicle.

Preferably, the sensor-correcting means comprises sensor data-storing means for reading data of the angular velocity signal from the angular velocity sensor, data of the acceleration signal from the acceleration sensor, and data of the speed signal from the speed sensor, a predetermined number of times per a predetermined time period, and for storing the read data, variable-calculating means for calculating the sensitivity coefficient and the offset value, based on the data stored in the sensor data-storing means, and control means for controlling the sensor data-storing means and the variable-calculating means.

Also preferably, the sensor-correcting means includes sensor data-storing means for reading data of the angular velocity signal from the angular velocity sensor, data of the acceleration signal from the acceleration sensor, and data of the speed signal from the speed sensor, a predetermined number of times per a predetermined time period, and for storing the read data, variable-calculating means for calculating the sensitivity coefficient and the offset value, based on the data stored in the sensor data-storing means, parameter-calculating means for calculating an actual value of the acceleration and an actual value of the angular velocity, based on an output from the parameter-calculating means, and control means for controlling the sensor data-storing means, the variable-calculating means, and the parameter-calculating means.

More preferably, the variable-calculating means includes updated data-storing means for storing updated data of the sensitivity coefficient and the offset value calculated immediately before the moving object is stopped, and wherein the parameter-calculating means calculates the angular velocity, based on the updated data of the sensitivity coefficient and the offset value read from the updated data-storing means, when the moving object is started again.

The above and other objects, features, and advantages of the invention will become more apparent from the following detailed description taken in conjunction with the accompanying drawings.

DETAILED DESCRIPTION

Now, the invention will be described in detail with reference to the drawings showing preferred embodiments thereof.

Figure 1:
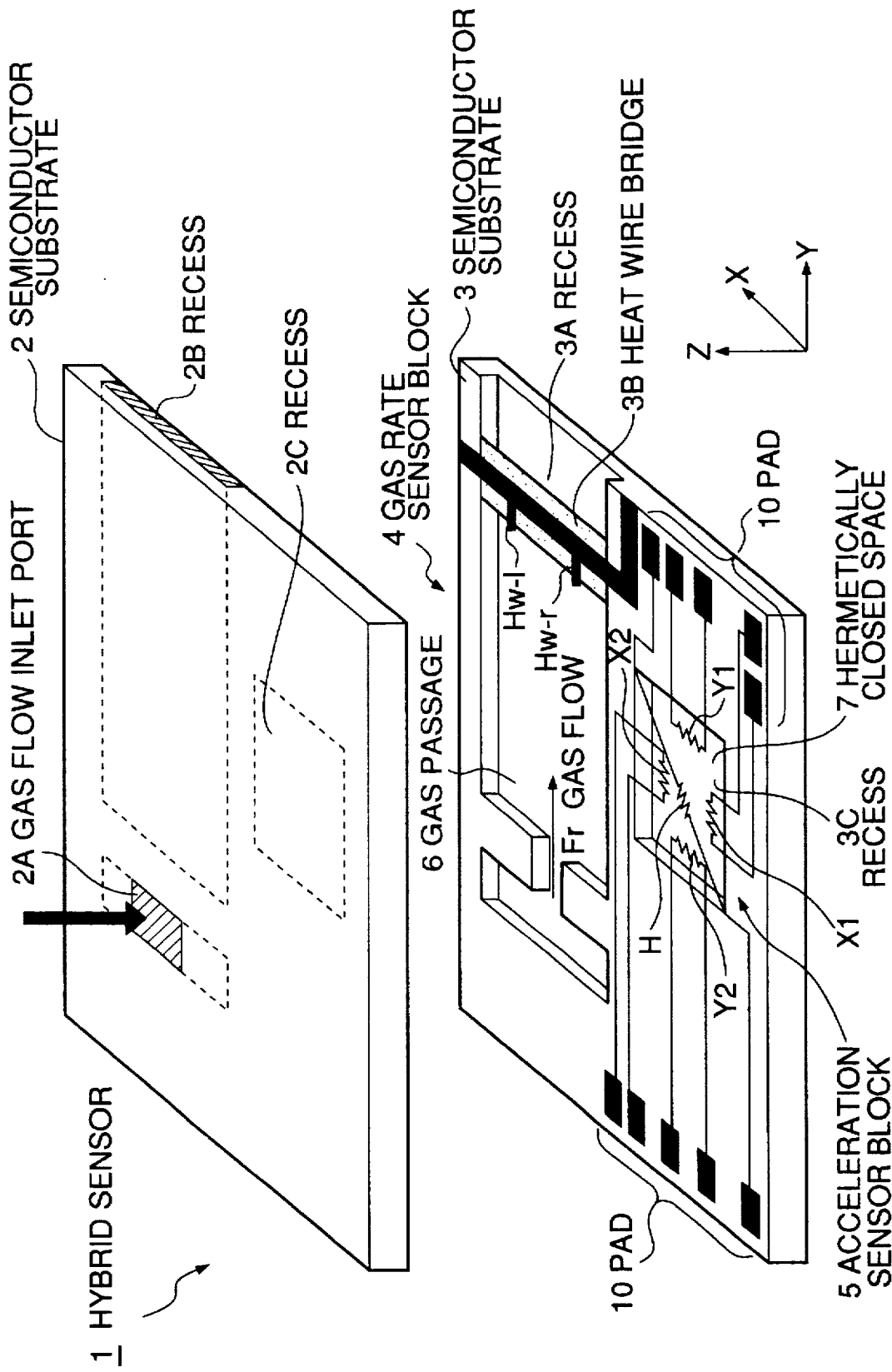
FIG. 1 is an exploded perspective view showing the configuration of a hybrid sensor according to a first embodiment of the invention.

Referring first to FIG. 1, there is shown an acceleration sensor-incorporated gas rate sensor, as a hybrid sensor according to a first embodiment of the invention.

In the present embodiment, the hybrid sensor is comprised of a two-axis gas-type acceleration sensor and a one-axis gas rate sensor which are constructed in one piece on a laminated semiconductor substrate.

As shown in FIG. 1, the acceleration sensor-incorporated gas rate sensor (hereinafter referred to as "hybrid sensor" unless otherwised specified) is comprised of a semiconductor substrate 2 and a semiconductor substrate 3.

The semiconductor substrate 2 is formed with a gas flow inlet port 2A vertically extending through the substrate, a recess 2B formed in the bottom surface of the substrate with a predetermined depth, which forms an upper half of a gas passage 6, and a recess 2C also formed in the bottom surface, which forms an upper half of a fluid-tight space 7. The gas flow inlet port 2A and the gas passage 6 form part of the gas flow sensor 4, while the fluid-tight space 7 forms part of the acceleration sensor 5.

The semiconductor substrate 3 has various elements and parts formed therein or thereon by semiconductor processing technology which repeatedly carries out deposition and several times of etching. More specifically, formed in or on the substrate 3 are a recess 3A, a heat wire bridge 3B, heat wire resistance elements $H_{w-1}$, $H_{w-r}$, connection leads and a pad, not shown, connected to the heat wire resistance elements, which form the gas rate sensor 4 together with the gas flow inlet port 2A and the recess 2B of the semiconductor substrate 2, as well as a recess 3C, a heat-generating resistance element H, heat-sensitive resistance elements X1, X2, Y1, Y2, and a pad 10 connected to the heat-generating resistance element and the temperature-sensitive resistance elements, which form the acceleration sensor 5, etc.

The heat wire bridge 3B of the gas rate sensor block 4 and a bridge, not shown, of the acceleration sensor 5 are formed by etching surfaces of the semiconductor substrate 3, and portions of the substrates 3 beneath the respective bridges form part of (i.e. are continuous to) the recess 3A and the recess 3C.

The heat wire resistances $H_{w-l}$, $H_{w-r}$ are formed on the surface of the heat wire bridge 3B of the gas rate sensor 4, and the heat-generating resistance element H, heat-sensitive resistance elements X1, X2, Y1, Y2 are formed on the surface of the bridge, not shown, of the acceleration sensor 5.

The heat wire resistance elements $H_{w-l}$, $H_{w-r}$, the heat-generating resistance element H, the temperature-sensitive resistance elements X1, X2, Y1, Y2 are formed by etching conductor regions formed e.g. by vapor deposition or crystal growth of platinum, tungsten, or a like material, according to a miniature pattern set on a photo mask.

The heat wire resistance elements $H_{w-l}$, $H_{w-r}$, the heat-generating resistance element H, the temperature-sensitive resistance elements X1, X2, Y1, Y2 are only different in resistance value from each other, and hence can be formed in the same manner at the same time.

The heat wire resistance elements $H_{w-l}$, $H_{w-r}$ are arranged on a common X-Y plane at a middle location in the Z-axis direction in the gas passage 6 formed by the recess 2B of the semiconductor substrate 2 and the recess 3B of the semiconductor substrate 3, and in a fashion being symmetric along the X-axis with respect to the central axis of a flow $F_r$ of gas flowing in the gas passage 6 along the Y-axis. With this arrangement, a one-axis angular velocity sensor can be used to detect angular velocity $\omega_x$ in a horizontal (yawing) direction as a moving object (e.g. automotive vehicle) on which the hybrid sensor 1 is installed angularly moves about Z-axis while the moving object is moving in the Y-axis direction.

The heat-generating resistance element H and the temperature-sensitive resistance elements X1, X2, Y1, Y2 are arranged on a common X-Y plane at an middle location in the Z-axis direction in the fluid-tight space 7 formed by the recess 2C of the semiconductor substrate 2 and the recess 3C of the semiconductor substrate 3, with the heating-generating resistance element H being positioned substantially at the center of the X-Y plane and pairs of temperature-sensitive resistance elements X1, X2 and Y1, Y2 being symmetrical or opposed to each other with respect to the heat-generating resistance element H as the center of symmetry along the X-axis and the Y-axis, respectively. With this arrangement, a two-axis angular acceleration sensor is provided which can be used to detect acceleration G acting in the X-axis and the Y-axis directions.

After the semiconductor substrates 2 and 3 have been prepared, a pressurized gas of nitrogen, argon, or the like, which is low in thermal conductivity, is charged into the fluid-tight space 7, and then the substrates are laminated one upon the other in the X-axis direction in a fashion hermetically sealing the fluid-tight space 7, to form the hybrid sensor 1.

The semiconductor substrate 3 has a size larger than that of the semiconductor 2, since it is required to form thereon the pad 10, for connections with external devices.

In this way, by employing the masking and micro processing technique used in the semiconductor manufacturing process, the hybrid sensor 1 can be formed in which the heat wire resistance elements $H_{w-l}$, $H_{w-r}$, the heat-generating resistance element H, and the temperature-sensitive resistance elements X1, X2, Y1, Y2, as well as the recesses 2B, 2C, 3B, 3C forming the gas passage 6 and the fluid-tight space 7 are formed at accurate locations and with accurate sizes, whereby the gas rate sensor 4 and the gas-type acceleration sensor 5 do not require adjustment of locations of the resistance elements, and the alignment thereof.

Further, the heat wire resistance elements $H_{w-l}$, $H_{w-r}$, the heat-generating resistance element H, and the temperature-sensitive resistance elements X1, X2, Y1, Y2 are formed on the semiconductor substrate 3, and hence each pair of the heat wire resistance elements $H_{w-l}$ and $H_{w-r}$, the temperature-sensitive resistance elements X1 and X2, and Y1 and Y2 are excellent in characteristic parity for use as a pair in respect of resistance and temperature characteristics, with very high accuracy of the ratio of resistance between the resistance elements of each pair. This makes it possible to obtain very stable output from the hybrid sensor which detects the angular velocity and acceleration by the ratio of resistance between the resistance elements of each pair.

Next, the operations of the gas rate sensor 4 and the gas flow-type acceleration sensor 5 of the hybrid sensor 1 will be described.

As described before, the gas rate sensor 4 has a pair of the heat wire resistances $H_{w-l}$, $H_{w-r}$ arranged in a fashion being symmetric with respect to the Y-axis, i.e. the central axis of the gas flow $F_Y$ and along the X-axis perpendicular to the Y-axis, and detects the angular velocity $\omega_x$ acting on the hybrid sensor 1 as the moving object angularly moves about the Z-axis.

For example, when the hybrid sensor 1 is installed on an automotive vehicle 1, if the vehicle is moving in the Y-axis direction, the sensor 1 can detect angular velocity in the yawing direction.

When the angular velocity in the yawing direction acts on the hybrid sensor 1, the Corioli force acts on the gas flow $F_Y$ to deviate the same, resulting in an imbalance of the flow rates of gas impinging on the heat wire resistance elements $H_{w-l}$, $H_{w-r}$, to change the resistance values thereof. Therefore, it is possible to detect the magnitude and direction of angular velocity in the yawing direction by detecting the difference between the resistance values of $H_{w-l}$ and $H_{w-r}$.

The gas flow-type acceleration sensor 5 has the heat-generating resistance element H, and the temperature-sensitive resistance elements X1, X2, Y1, Y2 arranged within the fluid-tight space 7, for detecting acceleration in the directions of the two axes (X-axis and Y-axis). The pressurized gas having low thermal conductivity, such as nitrogen and argon, is enclosed within the fluid-tight space 7.

In operation, power from an external power source (voltage source or current source) is applied to the heat-generating resistance element H to warm up the gas within the fluid-tight space 7 due to Joule heat generated, and a temperature distribution large in temperature gradient is formed which is inversely proportional to the distance from the heat-generating resistance element H.

The paired temperature-sensitive resistance elements X1 and X2 are arranged at an equal distance from the heat-generating substance H in the X-axis direction and the paired temperature-sensitive resistance elements Y1 and Y2 in the Y-axis direction, respectively. Therefore, if no acceleration G acts on the hybrid sensor 1, the temperature-sensitive resistance elements X1 and X2 or Y1 and Y2 are under the same temperature condition, i.e. have a temperature balance therebetween, whereby no acceleration is detected.

If acceleration G acts on the hybrid sensor in the X-axis direction for example when the temperature-sensitive resistance elements are thus in the balanced temperature conditions, the temperature distribution within the fluid-tight space 7 shifts in a direction opposite to the direction of action of the acceleration G, whereby the balance in temperature between the temperature-sensitive resistances X1 and X2 is lost, resulting in an increased temperature of the temperature-sensitive resistance X1 and a decreased temperature of the temperature-sensitive resistances element X2.

As the temperature of the temperature-sensitive resistance element X1 thus increases, the resistance of the same increases, while the temperature of the temperature-sensitive resistance element X2 lowers so that its resistance decreases. Therefore, it is possible to detect the magnitude of the acceleration G from a value (voltage or current value) corresponding to the difference between resistance values of the temperature-sensitive resistance elements X1 and X2, respectively, and the sign (+ or −) of the difference.

Thus, according to the present embodiment, the gas rate sensor detects the angular velocity $\omega_X$ about one axis in the yawing direction, i.e. the Z-axis, and the gas-type acceleration sensor detects the acceleration G in the directions of the two axes, i.e. the X-axis and the Y-axis.

Figure 2:
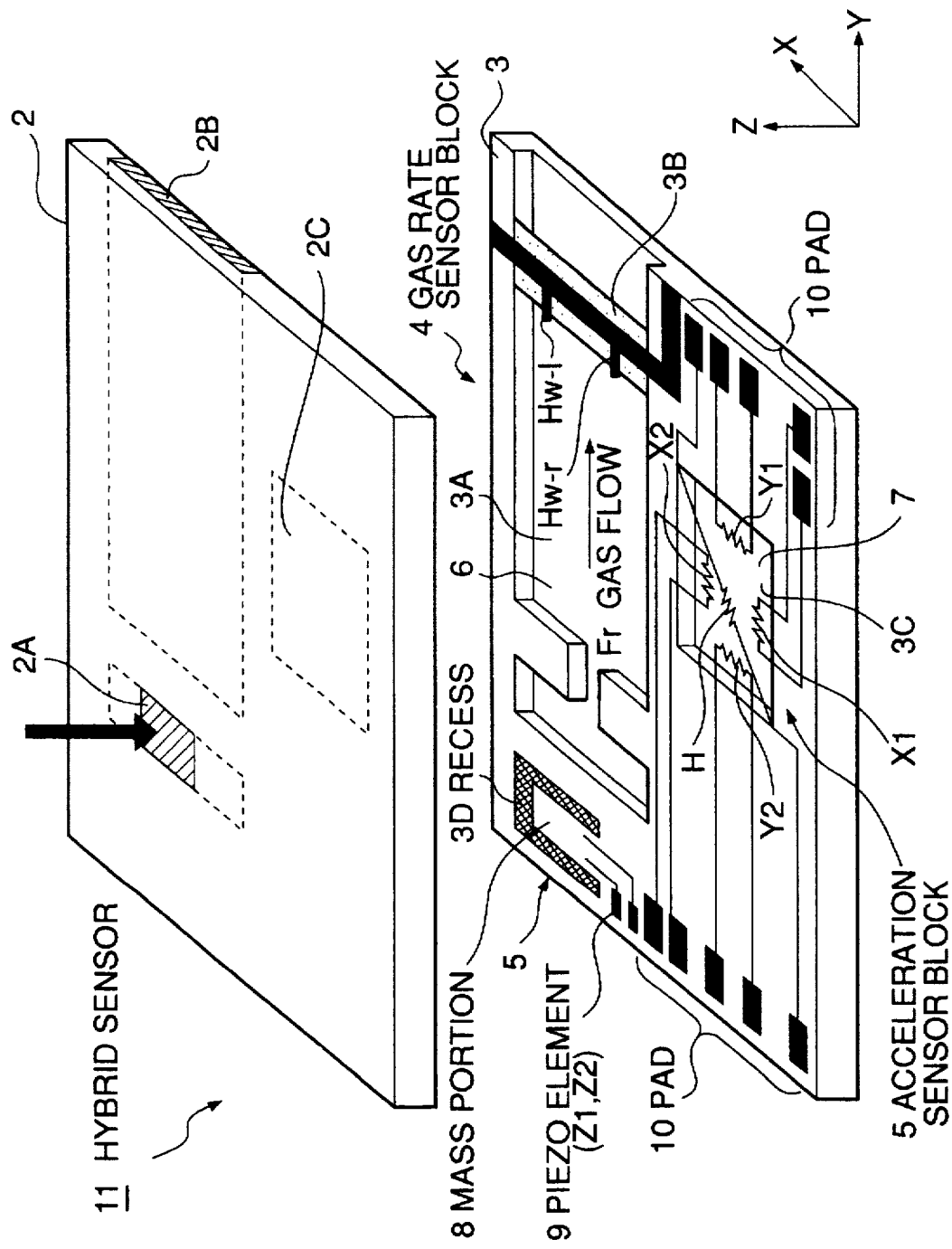
FIG. 2 is an exploded perspective view showing the configuration of a hybrid sensor according to a second embodiment of the invention.

FIG. 2 shows a second embodiment of the invention.

In the present embodiment, the hybrid sensor is comprised of a three-axis gas-type acceleration sensor and a one-axis gas rate sensor which are formed in one piece on a semiconductor substrate.

As shown in FIG. 2, this embodiment is distinguished from the first embodiment described above in that the hybrid sensor 11 is additionally provided with a one-axis piezo-type acceleration sensor in the acceleration sensor 11 block, for detecting acceleration G acting thereon.

The piezo-type acceleration sensor is formed in the semiconductor substrate 3 by etching. That is, a mass region 8 is cut out by scraping off three portions at sides of the mass region 8 to form a recess 3D, with a region connecting the mass region 8 with the main part the semiconductor substrate 3 being formed as a movable region (beam region) which is thinner in thickness than the mass region 8. The movable region (beam region) is bendable or deformable in a manner proportional to a force (product of the mass and acceleration) acting on the mass region 8, when acceleration G acts on the hybrid sensor 1 in the Z-axis direction.

More specifically, piezo elements Z1, Z2 are formed in the movable beam region by the semiconductor processing technique, such as vapor deposition, such that a bend or deformation of the movable region can be detected from changes in the resistance of the piezo electric elements Z1, Z2. Thus, acceleration G acting in the Z-axis direction can be detected.

The piezo-type acceleration sensor may be replaced by a capacity-type acceleration sensor.

Figure 3:
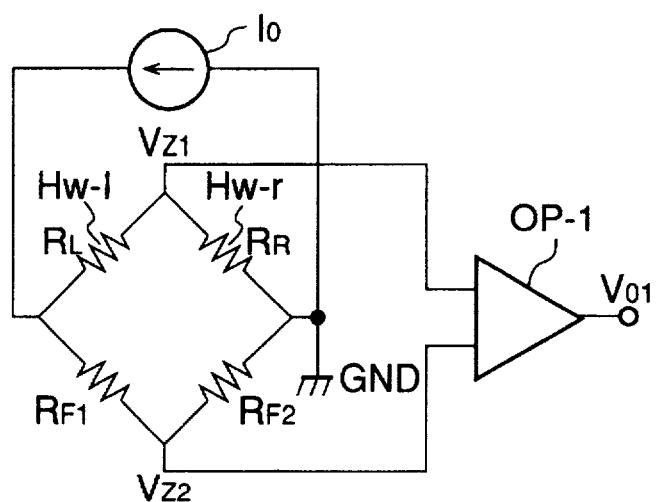
FIG. 3 is a circuit diagram of an angular velocity detection circuit of a one-axis gas rate sensor.

FIG. 3 shows the circuit configuration of an angular velocity-detecting circuit of the one-axis gas rate sensor, used in the first and second embodiments.

A resistance bridge circuit is formed by a pair of the heat wire resistance elements $H_{w-1}$ (resistance $R_L$) and $H_{w-r}$ (resistance $R_R$), and reference resistances $R_{F1}$, $RF_2$. Current from the power supply (regulated current source $I_0$) is applied to the resistance bridge circuit to obtain DC voltage outputs $V_{Z1}$, $V_{Z2}$. The DC voltage outputs $V_{Z1}$, $V_{Z2}$ are applied to a comparator formed e.g. of an operational amplifier OP-1, which in turn generates an output $V_{O1}$ indicative of the angular velocity corresponding to the difference $(V_{Z1}-V_{Z2})$.

The reference voltages $R_{F1}$, $R_{F2}$ are set to an equal value, so that the output $V_{O1}$ is proportion to the difference $(R_R-R_L)$, whereby the angular velocity acting in the yawing direction can be detected.

The magnitude of the angular velocity is determined from the level of the output $V_{O1}$, and the direction of the angular velocity from the sign of the same.

FIG. 4A to FIG. 4D show acceleration-detecting circuits of the three-axis acceleration sensor used in the second embodiment of the invention.

Figure 4A:
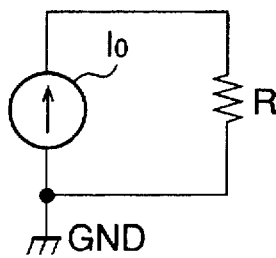
FIG. 4A to FIG. 4D are circuit diagrams of acceleration detection circuits of three-axis acceleration sensors.
Figure 4B:
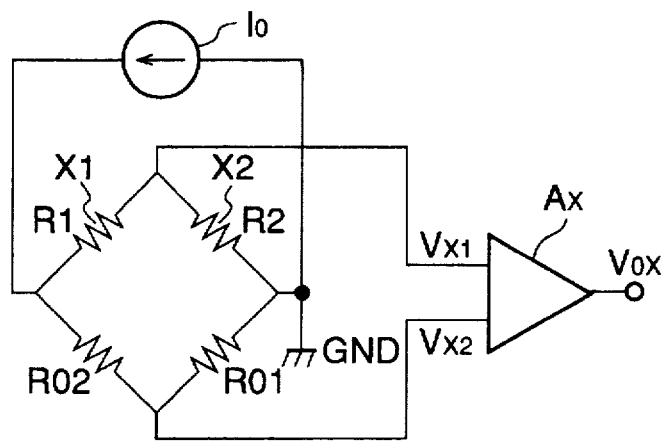
Figure 4C:
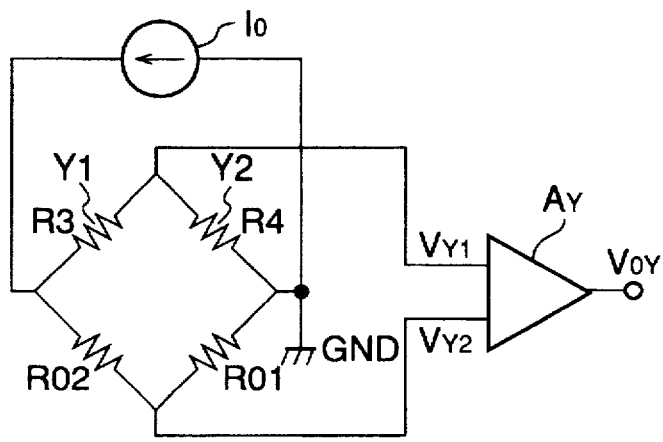
Figure 4D:
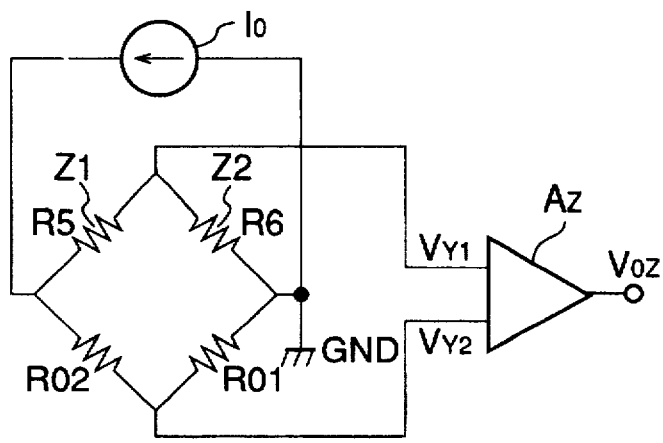

FIG. 4A shows the circuit of a heat-generating resistance-driving circuit, FIG. 4B an acceleration-detecting circuit for detecting acceleration in the direction X-axis, FIG. 4C an acceleration-detecting circuit for detecting acceleration in the Y-axis direction, and FIG. 4D an acceleration-detecting circuit for detecting acceleration in the Z-axis direction.

In these figures, the power source for driving the circuits is formed by a current source $(I_O)$. This is not limitative, but it may be formed by a voltage source $(V_O)$.

The heat-generating resistance driving circuit shown in FIG. 4A applies current from the power source $(I_O)$ to the resistance R of the heating-generating resistance element H to generate Joule heat corresponding to power of $(IO^2 \times R)$.

The acceleration-detecting circuit shown in FIG. 4B has a bridge circuit formed of the temperature-sensitive resistance element X1 (resistance R1), the temperature-sensitive resistance element X2 (resistance R2), and reference resistances Ro1, Ro, and a differential amplifier $A_X$ which generates an output $V_{OX}(V_{X1}-V_{X2})$ indicative of the difference between output voltages $V_{X1}$ and $V_{X2}$ from the bridge circuit, which is proportional to acceleration G acting in the X-axis direction.

The acceleration-detecting circuits shown in FIG. 4C and FIG. 4D each have a construction similar to that of the FIG. 4B circuit, wherein differential amplifiers $A_Y$, $A_Z$ generate outputs $V_{OY}(V_{Y1}-V_{Y2})$ and $V_{OZ}(V_{Z1}-V_{Z2})$ indicative of the differences between output voltages $V_{Y1}$ and $V_{Y2}$ and between output voltages $V_{Z1}$ and $V_{Z2}$ from the bridge circuits, which are proportional to acceleration G acting in the X-axis direction and the Y-axis direction, respectively.

Next, description will be made of a hybrid sensor according to a third embodiment of the invention, which incorporates a two-axis gas rate sensor and a three-axis gas-type acceleration sensor.

Figure 5:
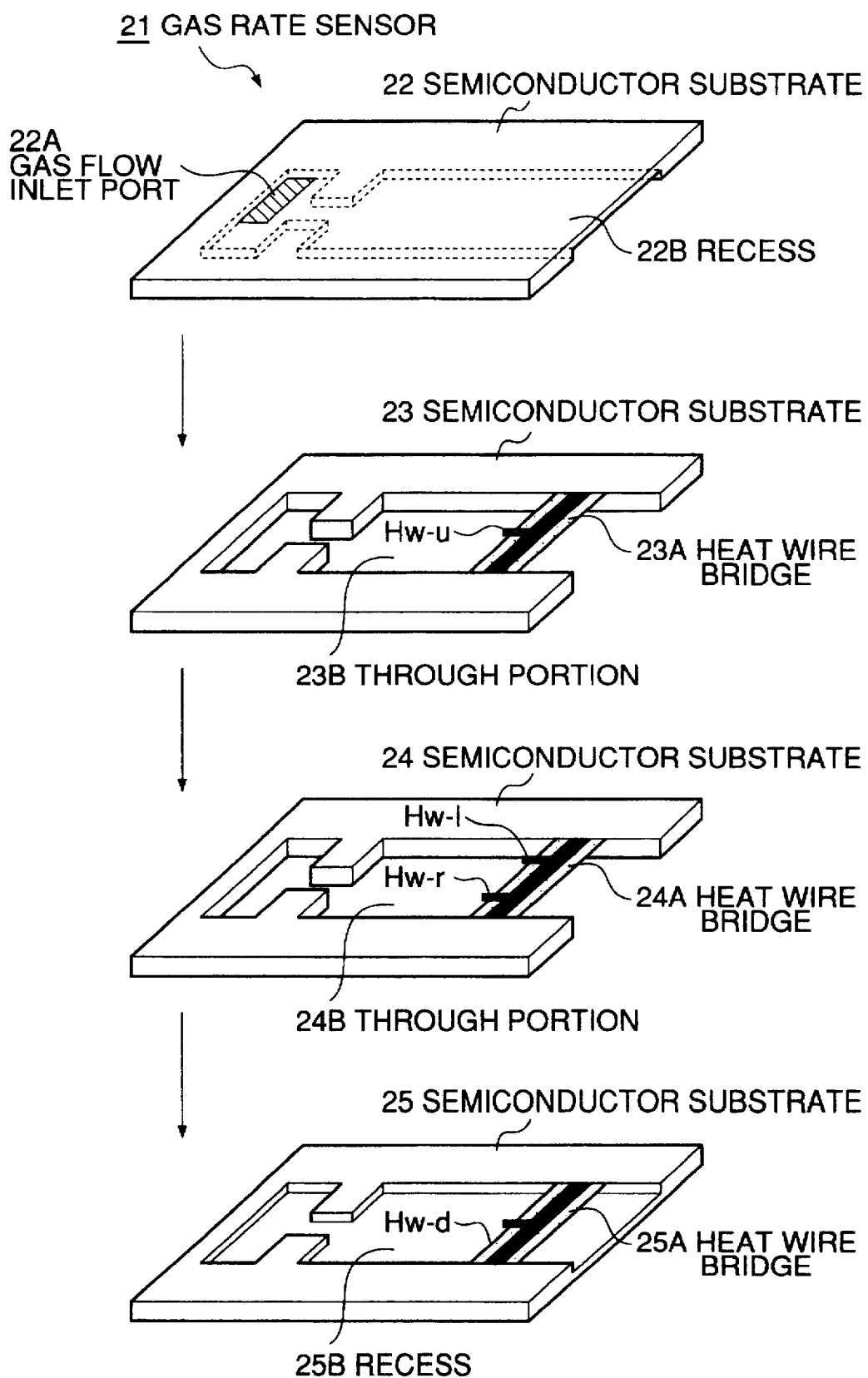
FIG. 5 is an exploded perspective view showing the configuration of essential parts of a two-axis gas rate sensor employed in a hybrid sensor according to a third embodiment of the invention.

FIG. 5 shows the arrangement of the two-axis gas rate sensor 21, which is formed of semiconductor substrates 22 to 25 stacked one upon another. This gas rate sensor is distinguished from shown in FIG. 2 in that in addition to the semiconductor substrates 22 and 24 corresponding to the gas rate sensor 4 of the FIG. 2 hybrid sensor 1, there are provided semiconductor substrates 23, 25 on which a pair of heat wire resistance elements $H_{W-u}$, and $H_{W-d}$ are provided, respectively, the pair of heat wire resistance elements $H_{W-u}$, $H_{W-d}$ being arranged at respective upper and lower locations along the Z-axis, thus forming a laminate of four layers of the semiconductor substrates 22 to 25.

Heat wire bridges 23A, 25A of the semiconductor substrates 23, 25, and the heat wire resistance elements $H_{W-u}$, $H_{W-d}$ are formed by the semiconductor processing technique of etching and vapor deposition in the same manner as described above with reference to FIG. 2.

After elements and parts are formed the semiconductor substrates 22 to 25, the substrates are stacked one upon another in the Z-axis direction into a laminate, thereby forming a two-axis gas rate sensor which can detect the angular velocities $\omega_x$ and $\omega_z$ about the Z-axis and the X-axis, respectively, as the vehicle moves about these axis.

Figure 6:
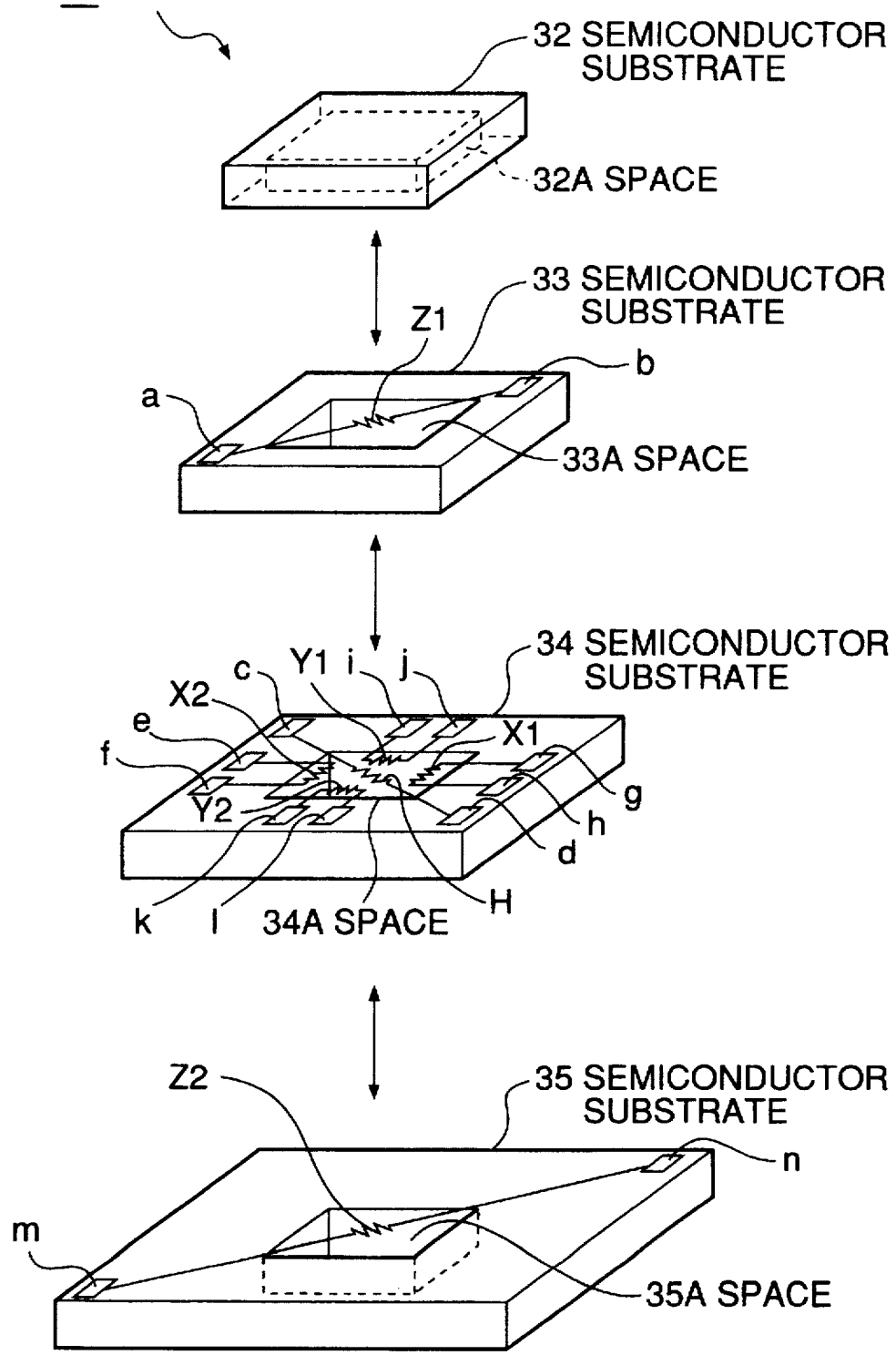
FIG. 6 is an exploded perspective view showing the configuration of essential parts of a three-axis gas acceleration sensor employed in the third embodiment of the invention.

FIG. 6 shows the arrangement of the three-axis gas-type acceleration sensor used in the third embodiment.

In FIG. 6, the three-axis gas-type acceleration sensor 31 is formed of semiconductor substrates 32 to 35. This acceleration sensor is distinguished from the acceleration sensor 5 of the FIG. 1 hybrid sensor 1 in that in addition to semiconductor substrates 32 and 34 corresponding to the acceleration sensor 5, there are provided semiconductor substrates 33, 35 on which are arranged a pair of temperature-sensitive resistance elements Z1 and Z2 at respective upper and lower locations along the Z-axis, thereby forming a laminated structure of four layers of the semiconductor substrates 32 to 35.

The temperature-sensitive resistance elements Z1 and Z2 of the semiconductor substrates 33 and 35 are formed by the semiconductor processing technique of etching and vapor deposition, similarly to the manner described hereinabove.

After elements and parts are formed on the semiconductor substrates 32 to 35, the subtracts are stacked one upon another into a laminate, thereby forming a three-axis acceleration sensor which can detect acceleration G acting in the three axes directions (X-axis, Y-axis, and Z-axis).

Then, the laminate of the semiconductor substrates 22 to 25 shown in FIG. 5 and the laminate of the semiconductor substrates 32 to 35 shown in FIG. 6, all of which substrates may be made of the same kind, are stacked one upon another in the Z-axis direction, to thereby form a hybrid sensor having the two-axis gas rate sensor and the three-axis gas-type acceleration sensor constructed in one piece.

Further, an angular velocity sensor for detecting angular velocity about the Y-axis may be formed by forming a gas passage for causing the gas to flow along the X-axis, and a pair of heat wire resistance elements arranged along the Z-axis. This angular velocity sensor can be additionally provided similarly to the two-axis gas rate sensor 21 described above.

Figure 7:
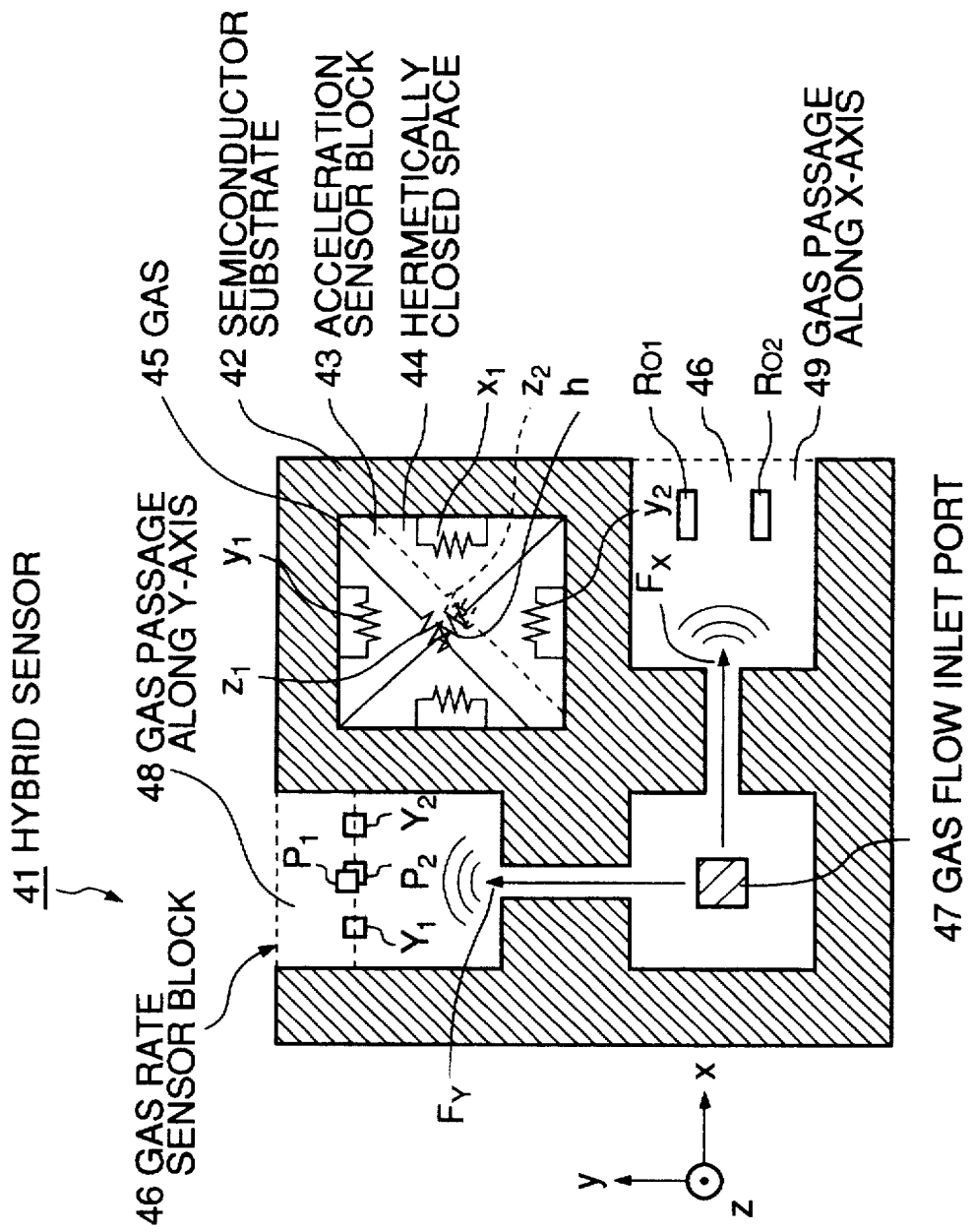
FIG. 7 is a sectional view showing the configuration of a hybrid sensor according to a fourth embodiment of the invention.

FIG. 7 shows the configuration of a three-axis hybrid sensor according to a fourth embodiment of the invention.

The hybrid sensor 41 has a three-axis gas rate sensor 46 block and a three-axis gas-type acceleration sensor 43 block.

The three-axis gas rate sensor 46 is provided with a gas passage 49 extending along the X-axis 49, in addition to a gas passage 48 extending along the Y-axis, which corresponds to one employed in the preceding embodiment described hereinabove.

In the gas passage 48 along the Y-axis, there are provided a pair of heat wire-type temperature-sensitive resistance elements Y1, Y2 for detecting angular velocity in the yawing direction, and a pair of heat wire temperature-sensitive resistance elements $P_1$, $P_2$ for detecting angular velocity in the pitching direction, and in the gas passage 49 along the X-axis 49, there are provided a pair of heat wire-type temperature-sensitive resistance elements $R_{O1}$, $R_{O2}$ for detecting angular velocity in the rolling direction, in a fashion symmetric with respect to the Y-axis.

In operation, gas jets $F_Y$, $F_X$ are supplied via a gas flow inlet port 47 to simultaneously cause the gas to flow along the gas passage 48 along the Y-axis and the gas passage 49 in the X-axis, whereby angular velocities $\omega_X$, $\omega_Z$, $\omega_Y$ in the yawing direction (about the Z-axis), the pitching direction (about the X-axis) and the rolling direction (about the Y-axis) can be detected independently of each other at the same time.

On the other hand, the three-axis gas-type acceleration sensor 43 is formed similarly to the manner described hereinabove with reference to FIG. 6. That is, as described before with reference to FIG. 1, pressurized gas 45 of nitrogen or argon is charged into a fluid-tight space 44, and three pairs of temperature-sensitive resistance elements $x_1$, $x_2$, $y_1$, $y_2$, $z_1$, $z_2$ are arranged along the three axes of the X-axis, Y-axis, and X-axis in a fashion that the resistance elements of each pair symmetrically opposed to each other with a heat-generating resistance element h being positioned at the center, thereby forming a three-axis gas-type acceleration sensor which can detect accelerations G acting along three axes, independently of each other at the same time.

According to the first to fourth embodiments described above, the hybrid sensor is comprised of a plurality of semiconductor substrates in or on which are formed, by semiconductor processing technology using a common photo mask, enclosed space-forming recesses, a heat-generating resistance element, and temperature-sensitive resistance elements, which form an acceleration sensor, and a gas flow passage and heat wire resistance elements, which form an angular velocity sensor, the semiconductor substrates being superposed one upon another and united into a laminate. Therefore, the hybrid sensor with the acceleration sensor and the angular velocity sensor formed in one piece can be manufactured at low costs. Further, the individual component parts of the hybrid sensor can be formed with ease and arranged in a desired layout with high accuracy, thereby facilitating manufacture of multi-axis type acceleration sensors and angular velocity sensors.

Moreover, according to the first to fourth embodiments, the acceleration sensor and the angular velocity sensor forming the hybrid sensor are formed by forming the heat-generating resistance element, temperature-sensitive resistance elements, and heat-wire resistance elements on the same semiconductor substrate or semiconductor substrates on the same manufacturing lot. As a result, proper characteristic parity can be achieved in respect of differences in resistance value between individual resistance elements, particularly, between resistance elements to be paired, as well as in temperature characteristics therebetween, which enables manufacture of a hybrid sensor having high accuracy.

Further, according to the first to fourth embodiments, the acceleration sensor forming the hybrid sensor employs a pressurized gas having low thermal conductivity, which is enclosed within the fluid-tight space. As a result, a temperature distribution with a large temperature gradient can be formed within the fluid-tight space, which can impart high sensitivity to the acceleration sensor.

As a whole, the hybrid sensor according to the first to fourth embodiments has high detection accuracy and high reliability and can be manufactured at low costs.

Next, a fifth embodiment of the invention will be described.

Figure 8:
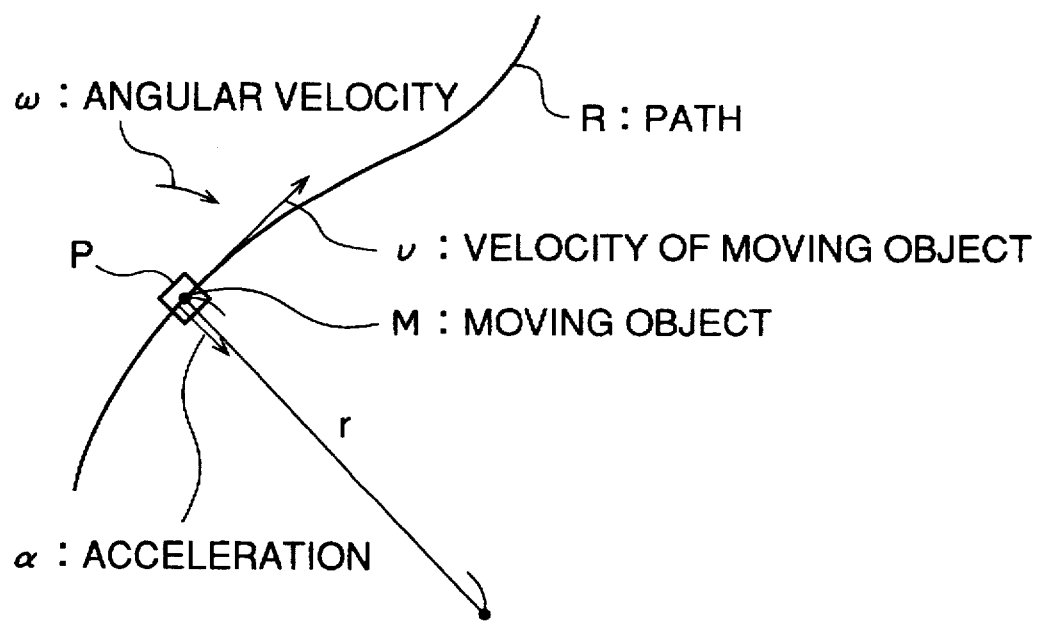
FIG. 8 is a diagram which is useful in explaining the principle of detection of the azimuthal angle by a hybrid sensor according to a fifth embodiment of the invention.

FIG. 8 shows how the advancing direction of the moving object is detected by a hybrid sensor according to the fifth embodiment.

Let it be assumed that the moving object M, e.g. an automotive vehicle, is moving along a path R in the form of an arc having a radius of curvature γ, and the velocity of the moving object M at a point P on the path R is represented by v, the angular velocity of the moving object by ω, and the acceleration of the same by α, which acts toward the center of the arc in a direction perpendicular to the direction of the velocity v. Then, the relationships shown in Equations (1a)

to (1c) below hold between the angular velocity $\omega$, the acceleration $\alpha$, the velocity v and the radius of curvature $\gamma$, from which the relationship between the angular velocity $\omega$, the acceleration $\alpha$, and the velocity v can be deduced as shown in Equation (c) wherein the radius of curvature $\gamma$ is not included which cannot be determined during traveling of the moving object M:

$$\alpha = v^2/\gamma \tag{1a}$$

$$\omega = v/\gamma \tag{1b}$$

$$\alpha/\omega = v \tag{c}$$

Next, let it be assumed that the angular velocity detected by an angular velocity sensor installed on the moving object is represented by $\omega_N$, the true value of the angular velocity by $\omega_{SN}$, a sensitivity coefficient and an offset value inclusive of a drift of output from the angular velocity sensor, by a and b, acceleration detected by an acceleration sensor installed on the moving object M by $\alpha_N$, the true value of the acceleration by $\alpha_{SN}$, and an offset value inclusive of a drift of output from the acceleration sensor by c, Equations (2a) and (2b) are obtained as shown below:

$$\omega_N = \alpha \times \omega_{SN} + b \tag{2a}$$

$$\alpha_N = \alpha_{SN} + c \tag{2b}$$

The sensitivity coefficient a, the offset values b and c represent incessant changes in the drifts of outputs from the sensors which change with the lapse of time, and changes in output characteristics of the sensors caused by aging or temperature thereof. These changes are obtained over a rather long time period, and hence are regarded as constant over a short time period of several seconds.

Further, from Equations (2a) and (2b), it can be considered that the angular velocity sensor undergoes a change in the sensitivity as well as a change in the output offset, but the acceleration sensor undergoes a change in the offset alone, with no change in sensitivity or a negligible change in the same, if any. Therefore, the sensitivity coefficient $\alpha$ and the offset value b are corrected to calculate the actual angular velocity (true value) $\omega_{SN}$.

Further, a basic equation is shown in Equation (3) below, in which the velocity v in Equations (1a) to (1c) is replaced by the speed $v_N$ detected by a velocity sensor on the assumption that the velocity detected by the velocity sensor is accurate. The unknown values a, b, c, $\omega_{SN}$, $\alpha_{SN}$ are obtained from Equations (2a), (2b) and (3). Note that the subscript $_N$ represents the number of times of detections carried out by the angular velocity sensor, the acceleration sensor, and the velocity sensor:

$$\omega_N = a \times \omega_{SN} + b \tag{3a}$$

$$\alpha_N = \alpha_{SN} + c \tag{3b}$$

$$\alpha_{SN} = \omega_{SN} \times v_N \tag{3c}$$

Equations (3a) to (3c), include five variables a, b, c, $\omega_{SN}$, $\alpha_{SN}$ which have unknown values, while the number of the equations is three. Whenever each sensor carries out detection, three equations are added, while the variables a, b, c can be regarded as constant over a short time period of several seconds. Accordingly, whenever each sensor carries out detection, two variables $\omega_{SN}$, $\alpha_{SN}$ are added. Therefore, at the third detection, the number of equations 3N become equal to the number of variables 5+2×(N−1). Therefore, the variables are calculated from results of detections carried out by each sensor three times over a short time period of several seconds.

If results of detections carried out by each of the angular velocity sensor, the acceleration sensor, and the velocity sensor are applied to Equations (3a) to (3c), Equations (3a) to (3c) can be rearranged with respect to $\omega_{SN}$, $\alpha_{SN}$ into Equations (4a) and (4b) below:

$$\alpha_{N(=1-3)} = \omega_{SN(=1-3)} \times v_{N(=1-3)} + c \tag{4a}$$

$$\omega_{SN(=1-3)} = (\omega_N(N=1-3) - b)/a \tag{4b}$$

If the six (N=1–3) equations of Equations (4a) and (4b) are solved and the resulting determined variables a, b, and c are assumed to be A, B, and C, respectively, the true value $\omega_{SN(=3)}$ of the angular velocity of the third detection can be determined according to Equation (4b) by the use of the sensitivity coefficient A, the offset value B, and the angular velocity $\omega_{N(=3)}$ detected by the angular velocity sensor, as shown in Equation (5):

$$\omega_{SN(=3)} = (\omega_{N(=3)} - B)/A \tag{5}$$

Further, according to necessity, the true value $\alpha_{SN(=1-3)}$ of the acceleration can be also determined based on Equations (3a) and (3b) from a difference between the acceleration $\alpha_{N(=1-3)}$ and the offset value c (=C).

If the true value $\omega_{SN(=3)}$ determined by Equation (5) is integrated over a time period from a time point t=0 to a predetermined time period To, the angle $\theta$ can be determined from Equation (6) below:

$$\theta = \int_{t0}^{T0} \omega_{SN(=3)} * dt \tag{6}$$

$$= \int_{0}^{T} \{(\omega_{N(-3)} - B)/A\} * dt$$

In the above described manner, it is possible to accurately calculate the angular velocity and the acceleration during travel of the moving object, by calculating the sensitivity coefficient a and the offset values b and c, based on outputs from the angular velocity sensor having the sensitivity coefficient a and the offset value b which incessantly change with the laps of time and the acceleration sensor having the offset value c which incessantly changes with the laps of time, but having stable sensitivity.

Further, similarly, the angle velocity and the acceleration can also be calculated during travel of the moving object by calculating the sensitivity coefficient a, a sensitivity coefficient D, and the effect c, based on outputs from an acceleration sensor having a sensitivity coefficient d and the offset value c which incessantly change with the lapse of time and an angular velocity sensor having the offset value c which incessantly changes with the lapse of time but having stable sensitivity.

Still further, the angular velocity and the acceleration can be accurately calculated during travel of the moving object by calculating sensitivity coefficients a, d and the offset values b, c based on outputs from the angular velocity sensor having the sensitivity coefficient a and the offset value b which incessantly change with the lapse of time, and the acceleration sensor having the sensitivity coefficient d and the offset value c which incessantly change with the lapse of time.

Figure 9:
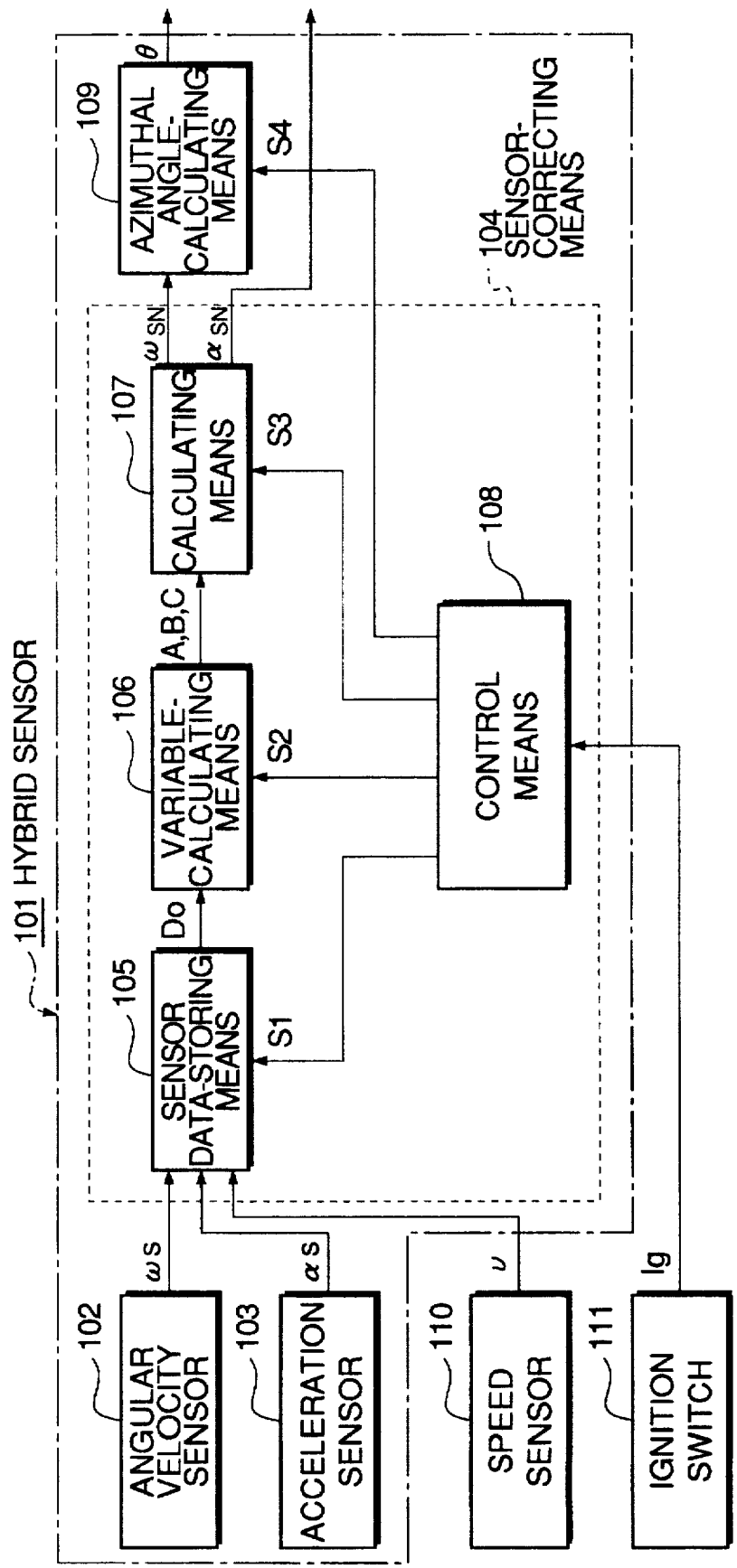
FIG. 9 is a block diagram showing essential parts of the hybrid sensor according to the fifth embodiment.

FIG. 9 shows essential parts of the hybrid sensor according to the fifth embodiment of the invention.

In the figure, the hybrid sensor 101 is comprised of an angular velocity sensor 102, an acceleration sensor 103, sensor-correcting means 104, and azimuthal angle-calculating means 109. A sensitivity coefficient drift and an offset drift of the angular velocity sensor 102, and an offset drift of the acceleration sensor 103 are corrected based on an angular velocity signal $\omega_S$ from the angular velocity sensor 102, an acceleration signal $\alpha_S$ from the acceleration sensor 103, and a vehicle speed signal v from an external vehicle speed sensor 110 arranged on the moving object M (e.g. automotive vehicle), thereby calculating an actual angular velocity $\omega_{SN}$ or an actual acceleration $\alpha_{SN}$. Then, the advancing direction of the moving object M is detected through calculation of the azimuthal angle $\theta$ from the actual angular velocity $\omega_{SN}$, and acceleration acting on the moving object M is calculated from the actual acceleration $\alpha_{SN}$.

Further, the start and stop of the hybrid sensor 101 are controlled based on an ignition signal Ig from an ignition switch 111, which starts and stops the moving object M (e.g. automotive vehicle).

The sensor-correcting means 104 is basically formed by a microprocessor and includes sensor data-storing means 105, variable-calculating means 106, calculating means 107, and control means 108.

The sensor data-storing means 105 is comprised of an interface circuit, an analog-to-digital (A/D) converter, a memory (RAM), etc., and operates in response to a control signal S1 from the control means 108, to convert the angular velocity signal $\omega_S$, acceleration signal $\alpha_S$, and the vehicle speed signal v, which are analog signals delivered from the respective sensors, a plurality of times (e.g. three times over several seconds), into respective digital signals. The digital signals thus obtained are stored as sensor data $D_0$ (obtained from Equations (3a) to (3c) three times: $\omega_N(1-3)$, $\alpha_N(1-3)$, and $v_N(1-3)$), and supplies the stored sensor data $D_0$ to the variable-calculating means 106.

The variable-calculating means 106 has a calculating block for carrying out calculations based on Equations (4a) and (4b). Responsive to a control signal S2 from the control means 108, the variable-calculating means 106 calculates the sensitivity coefficient A and offset value B of the angular velocity sensor 102 and the offset value C of the acceleration sensor 103, based on the sensor data $D_0$, and delivers signals indicative of the calculated sensitivity coefficient A, offset value B, and offset value C to the calculating means 107.

The calculating means 107 has a calculating block for carrying out calculations based on Equation (5) and Equations (3a) to (3c). Responsive to a control signal S3 from the control means 8, the calculating means 107 calculates the actual angular velocity $\omega_{SN}(=3)$ based on the sensitivity coefficient A, the offset value B, and a third value of the angular velocity data $\omega_N(=3)$, and delivers a signal indicative of the calculated actual angular velocity $\omega_{SN}$. Further, the calculating means 107 calculates the actual acceleration $\alpha_{SN}$ based on the offset value C and a third value of the actual acceleration data $\alpha_N(=3)$, and delivers a signal indicative of the calculated actual acceleration $\alpha_{SN}$.

The control means 108 is comprised of a reference clock circuit, a timer circuit, a sequencer circuit, a ROM storing control programs, etc., and supplies the control signals S1 to S3 to the sensor data-storing means 105, the variable-calculating means 106, and the calculating means 107 for control of the sequence and timing of reading, storing, calculations, delivery, etc. of signals by those means.

Further, the control means 108 supplies a control signal S4 to the azimuthal angle-calculating means 109 for controlling the timing of calculation or delivery of the calculation results (azimuthal angle $\theta$) executed by the azimuthal angle-calculating means 109.

In other words, the control means 108 controls the operation such that the angular velocity signal $\omega_S$, the acceleration signal $\alpha_S$, and the vehicle speed signal v are read in three times over a short time period (to) of several seconds, the actual angular velocity $\omega_{SN}(=3)$ is calculated based on the sensitivity coefficient A, the offset value B, and a third value of the angular velocity signal $\omega_S$, the calculated actual angular velocity $\omega_{SN}(=3)$ is integrated over a predetermined time period To to obtain the azimuthal angle $\theta$, and the above control procedure is repeatedly carried out with a repetition period T (=to+To) of the sum of the time periods to and To.

The start and stop of the control means 108 are controlled based on the ignition signal Ig delivered from the ignition switch 111.

The azimuthal angle-calculating means 109 includes integrating means which carries out integrating operation by the use of Equation (6). Responsive to the control signal S4 from the control means 108, the azimuthal angle-calculating means 109 integrates the actual angular velocity $\omega_{SN}(=3)$ over the time period To to thereby obtain the azimuthal angle $\theta$, and delivers the same.

Figure 10:
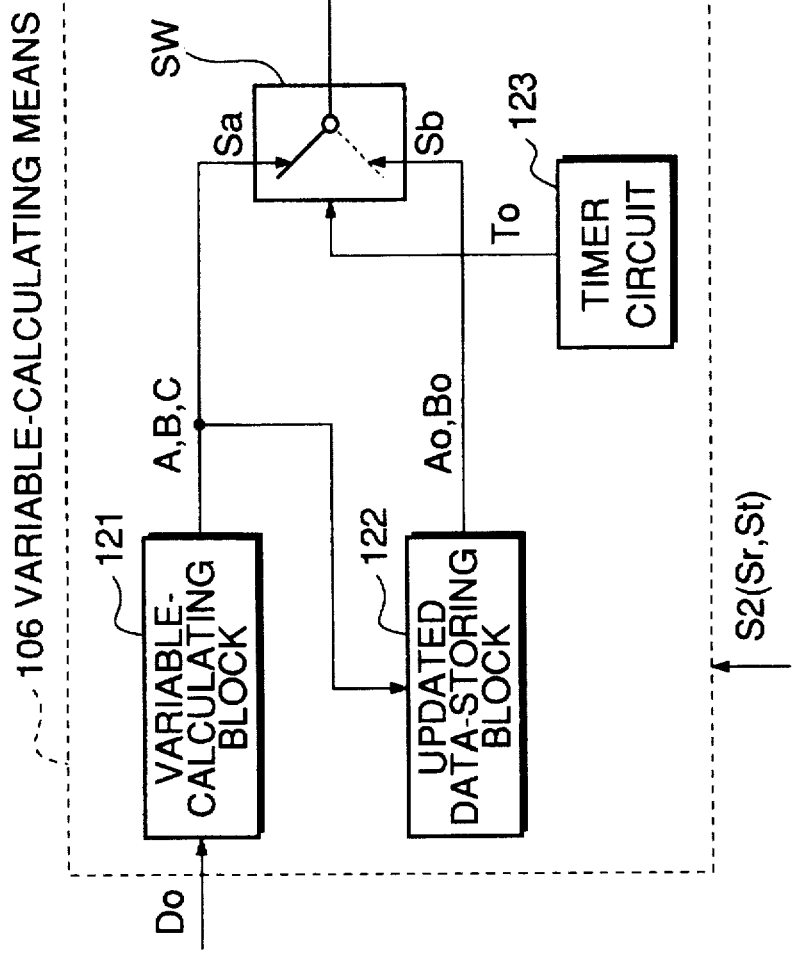
FIG. 10 is a block diagram showing essential parts of the hybrid sensor, i.e. variable-calculating means provided in sensor-correcting means, according to the fifth embodiment.

FIG. 10 shows essential parts of the variable-calculating means 106 provided within the sensor-correcting means 104 of the hybrid sensor according to the fifth embodiment.

The variable-calculating means 106 includes a variable-calculating block 121, an updated data-storing block 122, a timer circuit 123, and switching means SW.

The variable-calculating block 121 includes a calculating block for carrying out calculations based on Equation (4a) and (4b). Responsive to the control signal S2, the variable-calculating block 121 calculates the sensitivity coefficient A and offset value B of the angular velocity sensor 102 and the offset value C of the acceleration sensor 103 based on the sensor data $D_0$, and delivers signals indicative of the calculated sensitivity coefficient A and offset value B to the updated data-storing block 122 and a switching means SW, and a signal indicative of the calculated offset value C to the switching means SW.

The updated data-storing block 122 is formed of a reloadable memory, such as a RAM. When the ignition switch 111 shown in FIG. 9 is turned off to stop the moving object N, the updated data-storing block 122 reads the sensitivity coefficient A (=Ao) and the offset value B (=Bo) from the variable-calculating block 121 in response to a stop signal St (as one form of the control signal S2) from the control means 108, and stores the same as updated data Ao and Bo.

Further, when the ignition switch 111 is turned on to move the moving object M again, the updated data-storing block 122 operates in response to a start signal Sr (as another form of the control signal S2) from the control means 108 to deliver the updated data Ao and Bo stored therein to the switching means SW for a predetermined time period.

The switching means SW is formed by a logical switch or the like, and under the control of a timer information signal T supplied from the timer circuit 123, it selects either the signals indicative of the sensitive coefficient A and the offset values B and C, or the updated data Ao and Bo from the updated data-storing block 22, to supply the selected signals or data to the calculating means 107 appearing in FIG. 9.

Thus, the variable-calculating means 6 stores data of the sensitivity coefficient A and the offset value B assumed when the ignition switch 111 of the moving object M is turned off, as the updated data Ao and Bo, and when the ignition switch 111 is turned on to move the moving object M again, supplies the updated data Ao and Bo as the last data for the predetermined time period. Therefore, it is possible to calculate the azimuthal angle θ based on the actual angular velocity signal $\omega_{SN}$ immediately upon the start or resumption of movement of the moving object M when the sensitivity coefficient A and the offset value B are yet not determined.

Although the above embodiment is constructed such that a sensitivity drift and an offset drift in the output from the angular velocity sensor are corrected during movement of the moving object, by the use of the acceleration sensor which is small in sensitivity drift, to thereby accurately detect the direction of movement of the moving object, this is not limitative, but an angular velocity sensor which is small in sensitivity drift may be used to correct a sensitivity drift and an offset drift in the acceleration sensor during movement of the moving object to thereby accurately detect acceleration acting on the moving object.

Alternatively, an acceleration sensor which incessantly changes in sensitivity drift and offset drift and an angular velocity sensor which incessantly changes in sensitivity drift and offset drift may be used to correct sensitivity drift and an offset drift in the acceleration sensor as well as those in the angular velocity sensor during movement of the moving object to thereby accurately detect acceleration acting on the moving object.

According to the fifth embodiment described above, the sensor-correcting means reads an acceleration signal, an angular velocity signal, and a speed signal from a speed sensor mounted in the moving object a plurality of times, and calculates the sensitivity coefficient and offset value of the angular velocity sensor, based on the read data to obtain the actual angular velocity, and the azimuthal angle-calculating means calculates the azimuthal angle, based on the calculated actual angular velocity. As a result, a sensitivity drift and an offset drift in the output from the angular velocity sensor which incessantly change with the lapse of time can be corrected to accurately determine the azimuthal angle, whereby the moving direction of the moving object can be determined with high accuracy.

Further, according to the fifth embodiment, the sensor-correcting means calculates the sensitivity coefficient and offset value of the acceleration sensor and corrects the same. As a result, the actual acceleration of the moving object can be detected with high accuracy.

Moreover, according to the fifth embodiment, the variable-calculating means is provided with the updated data-storing means which stores values of the sensitivity coefficients and offsets calculated immediately before the moving object is stopped, and calculates the angular velocity of the moving object, based on the stored updated data, when the moving object is started again. As a result, the moving direction of the moving object as well as the acceleration thereof can be detected with high accuracy also when the vehicle is started.

As a whole, the hybrid sensor according to the fifth embodiment has high detection accuracy and high reliability, thus being advantageous over the conventional sensors.

Further, the invention may be applied to control of mobile robots, active suspensions and anti-lock braking systems for automotive vehicles, etc.

What is claimed is:

1. A hybrid sensor comprising:
   an acceleration sensor for detecting acceleration based on a temperature distribution of a predetermined gas hermetically enclosed within a fluid-tight space, said acceleration sensor comprising heat-generating resistance means for heating said predetermined gas to form said temperature distribution within said fluid-tight space, and temperature-sensitive resistance means for detecting a change in said temperature distribution caused by acceleration acting on said hybrid sensor; and an angular velocity sensor for detecting angular velocity based on a deviation of a flow of a predetermined gas, said angular velocity sensor comprising a gas passage through which said predetermined gas is caused to flow, and heat wire resistance means arranged within said gas passage for detecting said deviation of said flow of said predetermined gas caused by action of said angular velocity;

said acceleration sensor and said angular velocity sensor being formed in one piece by the use of semiconductor processing technology in a manner such that said acceleration sensor and said angular velocity sensor are formed on a plurality of semiconductor substrates, and then said plurality of semiconductor substrates are superimposed upon another and united into laminate, said acceleration sensor and said angular velocity sensor both being within the laminate, wherein said acceleration sensor and said angular velocity sensor being capable of detecting, respectively, said acceleration and said angular velocity simultaneously and independently of each other.

2. A hybrid sensor according to claim 1, wherein said heat-generating resistance means comprises a heat-generating resistance element arranged at a center of said fluid-tight space, and said temperature-sensitive resistance means comprises at least one pair of temperature-sensitive resistance elements, said temperature-sensitive resistance elements of each pair being arranged in a fashion being symmetrical with respect to said heat-generating resistance element along a corresponding one of plurality of axes.

3. A hybrid sensor according to claim 1, wherein said predetermined gas enclosed within said fluid-tight space is a pressurized gas having low thermal conductivity.

4. A hybrid sensor according to claim 2, wherein said predetermined gas enclosed within said fluid-tight space is a pressurized gas having low thermal conductivity.

5. A hybrid sensor according to claim 1, wherein said angular velocity sensor comprises a gas passage through which said predetermined gas is caused to flow, and heat wire resistance means arranged within said gas passage for detecting said deviation of said flow of said predetermined gas caused by action of said angular velocity.

6. A hybrid sensor according to claim 1, wherein said heat wire resistance means comprises at least one pair of heat wire temperature-sensitive resistance elements, said heat wire temperature-sensitive resistance elements of each pair being arranged in a fashion being symmetrical with respect to a central axis of said flow of said predetermined gas along a corresponding one of a plurality of axes.

7. A hybrid sensor according to claim 1, wherein said acceleration sensor is a two-axis acceleration sensor and said angular velocity sensor is a one-axis angular velocity sensor.

8. A hybrid sensor according to claim 1, wherein said acceleration sensor is a three-axis acceleration sensor and said angular velocity sensor is a one-axis angular velocity sensor.

9. A hybrid sensor according to claim 1, wherein said acceleration sensor is a three-axis acceleration sensor and said angular velocity sensor is a two-axis angular velocity sensor.

10. A hybrid sensor according to claim 1, wherein said acceleration sensor is a three-axis acceleration sensor and said angular velocity sensor is a three-axis angular velocity sensor.

11. A hybrid sensor according to claim 1, wherein said hybrid sensor is installed on a moving object, and wherein said acceleration sensor detects acceleration of said moving object and said angular velocity sensor detects angular velocity of said moving object.

12. A hybrid sensor according to claim 11, wherein said moving object is an automotive vehicle.

13. A hybrid sensor according to claim 11 further comprising
sensor-correcting means for correcting a sensitivity coefficient and an offset value of at least one of said angular velocity and said acceleration sensor, based on said velocity signal from said angular velocity sensor, said acceleration signal from said acceleration sensor, and a speed signal from a speed sensor for detecting speed of said vehicle.

14. A hybrid sensor according to claim 13, wherein said sensor-correcting means comprises sensor data-storing means for reading data of said angular velocity signal from said angular velocity sensor, data of said acceleration signal from said acceleration sensor, and data of said speed signal from said speed sensor, a predetermined number of times per a predetermined time period, and for storing the read data, variable-calculating means for calculating said sensitivity coefficient and said offset value, based on said data stored in said sensor data-storing means, and control means for controlling said sensor data-storing means and said variable-calculating means.

15. A hybrid sensor according to claim 13, wherein said sensor-correcting means includes sensor data-storing means for reading data of said angular velocity signal from said angular velocity sensor, data of said acceleration signal from said acceleration sensor, and data of said speed signal from said speed sensor, a predetermined number of times per a predetermined time period, and for storing the read data, variable-calculating means for calculating said sensitivity coefficient and said offset value, based on said data stored in said sensor data-storing means, parameter-calculating means for calculating an actual value of said acceleration and an actual value of said angular velocity, based on an output from said parameter-calculating means, and control means for controlling said sensor data-storing means, said variable-calculating means, and said parameter-calculating means.

16. A hybrid sensor according to claim 14, wherein said variable-calculating means includes updated data-storing means for storing updated data of said sensitivity coefficient and said offset value calculated immediately before said moving object is stopped, and wherein said parameter-calculating means calculates said angular velocity, based on said updated data of said sensitivity coefficient and said offset value read from said updated data-storing means, when said moving object is started again.

17. A hybrid sensor comprising:

an acceleration sensor for detecting acceleration based on a temperature distribution of a predetermined gas hermetically enclosed within a fluid-tight space, said acceleration sensor comprising heat-generating resistance means for heating said predetermined gas to form said temperature distribution within said fluid-tight space, and temperature-sensitive resistance means for detecting a change in said temperature distribution caused by acceleration acting on said hybrid sensor; and an angular velocity sensor for detecting angular velocity based on a deviation of a flow of a predetermined gas, said angular velocity sensor comprising a gas passage through which said predetermined gas is caused to flow, and heat wire resistance means arranged within said gas passage for detecting said deviation of said flow of said predetermined gas caused by action of said angular velocity;

said acceleration sensor and said angular velocity sensor being positioned side by side and formed in one piece by the use of semiconductor processing technology in a manner such that said acceleration sensor and said angular velocity sensor are formed on a plurality of semiconductor substrates, said plurality of semiconductor substrates being superimposed upon another and united into laminate, said acceleration sensor and said angular velocity sensor both being within the laminate, wherein said acceleration sensor and said angular velocity sensor being capable of detecting, respectively, said acceleration and said angular velocity simultaneously.

* * * * *